(12) United States Patent
Pierick et al.

(10) Patent No.: US 10,414,481 B2
(45) Date of Patent: Sep. 17, 2019

(54) METHOD FOR FORMING A STRUCTURAL PANEL

(71) Applicant: Rohr, Inc., Chula Vista, CA (US)

(72) Inventors: David E. Pierick, San Diego, CA (US); Raymond R. Listak, Chula Vista, CA (US); Andrew S. Gurney, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 388 days.

(21) Appl. No.: 15/431,895

(22) Filed: Feb. 14, 2017

(65) Prior Publication Data
US 2018/0229829 A1    Aug. 16, 2018

(51) Int. Cl.
*B64C 1/00* (2006.01)
*B64F 5/00* (2017.01)
(Continued)

(52) U.S. Cl.
CPC ............... *B64C 1/40* (2013.01); *B32B 37/06* (2013.01); *B32B 37/14* (2013.01); *B32B 38/04* (2013.01);
(Continued)

(58) Field of Classification Search
CPC ..... B64C 1/00; B64C 1/40; B64F 5/00; B64F 5/10; B32B 37/00; B32B 37/06; B32B 37/10; B32B 37/14; B32B 38/00; B32B 38/04; B64D 29/00; B64D 33/00; B64D 33/06; F02C 7/00; F02C 7/20; F02C 7/24; F02K 1/00; F02K 1/80; F02K 1/82; F02K 1/82; F02K 1/827; G10K 11/00;
(Continued)

(56) References Cited

U.S. PATENT DOCUMENTS 3,380,206 A    4/1968 Barnett
3,542,152 A    11/1970 Adamson et al.
(Continued)

FOREIGN PATENT DOCUMENTS

CN    104723616    6/2015
FR    2201010    4/1974
(Continued)

OTHER PUBLICATIONS

EP search report for EP18156778.5 dated Jul. 25, 2018.

*Primary Examiner* — Jacob T Minskey
*Assistant Examiner* — Matthew Hoover
(74) *Attorney, Agent, or Firm* — O'Shea Getz P.C.

(57) ABSTRACT

During a method for forming a structural panel, a core structure is formed that includes a plurality of corrugated ribbons and a plurality of walls. Each of the corrugated ribbons is laterally between a respective adjacent pair of the walls. Each of the corrugated ribbons includes a plurality of baffles and a plurality of porous septums. Each of the porous septums is longitudinally between a respective adjacent pair of the baffles. The forming of the core structure includes bonding a first of the walls to a first of the corrugated ribbons and subsequently bonding a second of the walls to the first of the corrugated ribbons. The core structure is bonded to a first skin. The core structure is bonded to a second skin. The core structure is vertically between the first skin and the second skin, and the first skin is configured with a plurality of perforations.

19 Claims, 7 Drawing Sheets

(51) Int. Cl.

| | | |
|---|---|---|
| *B32B 37/00* | (2006.01) | |
| *B32B 38/00* | (2006.01) | |
| *B64D 29/00* | (2006.01) | |
| *B64D 33/00* | (2006.01) | |
| *F02C 7/00* | (2006.01) | |
| *F02K 1/00* | (2006.01) | |
| *G10K 11/00* | (2006.01) | |
| *B64C 1/40* | (2006.01) | |
| *F02C 7/24* | (2006.01) | |
| *B32B 37/14* | (2006.01) | |
| *B32B 37/06* | (2006.01) | |
| *B32B 38/04* | (2006.01) | |
| *F02K 1/34* | (2006.01) | |
| *F02K 1/82* | (2006.01) | |
| *G10K 11/168* | (2006.01) | |
| *B64F 5/10* | (2017.01) | |
| *F02C 7/045* | (2006.01) | |
| *G10K 11/172* | (2006.01) | |
| *B64D 33/02* | (2006.01) | |

(52) U.S. Cl.
CPC ............. *B64D 29/00* (2013.01); *B64D 33/00* (2013.01); *B64D 33/06* (2013.01); *B64F 5/10* (2017.01); *F02C 7/24* (2013.01); *F02K 1/827* (2013.01); *G10K 11/168* (2013.01); *B32B 2038/047* (2013.01); *B32B 2307/10* (2013.01); *B64D 2033/0206* (2013.01); *F02C 7/045* (2013.01); *F05D 2220/323* (2013.01); *F05D 2230/00* (2013.01); *G10K 11/172* (2013.01); *Y02T 50/672* (2013.01)

(58) Field of Classification Search
CPC ........ G10K 11/10; G10K 11/16; G10K 11/16; G10K 11/168
See application file for complete search history.

(56) References Cited

U.S. PATENT DOCUMENTS

| | | |
|---|---|---|
| 3,639,106 A | 2/1972 | Yate |
| 3,734,234 A * | 5/1973 | Wirt .......................... E04B 1/86 181/286 |
| 3,821,999 A | 7/1974 | Guess et al. |
| 3,850,261 A | 11/1974 | Hehmann et al. |
| 3,910,374 A | 10/1975 | Holehouse |
| 3,948,346 A | 4/1976 | Schindler |
| 4,189,027 A | 2/1980 | Dean, III et al. |
| 4,240,519 A | 12/1980 | Wynosky |
| 5,923,003 A | 7/1999 | Arcas et al. |
| 5,997,985 A | 12/1999 | Clarke et al. |
| 6,598,701 B1 | 7/2003 | Wood et al. |
| 6,871,725 B2 | 3/2005 | Johnson |
| 7,124,856 B2 | 10/2006 | Kempton et al. |
| 7,784,283 B2 | 8/2010 | Yu et al. |
| 7,814,658 B2 | 10/2010 | Akishev et al. |
| 7,878,229 B2 | 2/2011 | Nakajima et al. |
| 7,959,109 B2 | 6/2011 | Dasilva et al. |
| 7,963,362 B2 | 6/2011 | Lidoine |
| 7,971,684 B2 | 7/2011 | Gantie et al. |
| 8,025,122 B2 | 9/2011 | Giloreest et al. |
| 8,245,815 B2 | 8/2012 | Valleroy et al. |
| 8,336,316 B2 | 12/2012 | Kirby |
| 8,413,922 B2 | 4/2013 | Porte et al. |
| 8,449,707 B2 | 5/2013 | Simmons et al. |
| 8,544,598 B2 | 10/2013 | Gaudry et al. |
| 8,646,574 B2 | 2/2014 | Drevon et al. |
| 8,684,301 B2 | 4/2014 | Porte et al. |
| 8,733,501 B2 | 5/2014 | Porte et al. |
| 8,763,751 B2 | 7/2014 | Starobinski et al. |
| 8,776,946 B2 | 7/2014 | Todorovic |
| 8,820,477 B1 | 9/2014 | Herrera et al. |
| 8,955,643 B2 | 2/2015 | Liu |
| 2011/0100747 A1 | 5/2011 | Hoetzeldt et al. |
| 2013/0266772 A1 | 10/2013 | Fujii |
| 2014/0034416 A1 * | 2/2014 | Liu .......................... F02C 7/045 181/290 |
| 2014/0349082 A1 | 11/2014 | Tien |
| 2015/0284945 A1 | 10/2015 | Tien |
| 2015/0367953 A1 * | 12/2015 | Yu .......................... B64D 33/06 181/222 |
| 2017/0225764 A1 | 8/2017 | Nampy et al. |

FOREIGN PATENT DOCUMENTS

| | | |
|---|---|---|
| GB | 1406844 | 9/1975 |
| RU | 2413654 | 6/2010 |

* cited by examiner

METHOD FOR FORMING A STRUCTURAL PANEL

BACKGROUND OF THE INVENTION

1. Technical Field

This disclosure relates generally to a structural panel and, more particularly, to forming a structural acoustic panel for use in, for example, an aircraft nacelle.

2. Background Information

Structural acoustic panels may be used in various applications to attenuate noise. An acoustic panel, for example, may be configured for a nacelle of an aircraft propulsion system to attenuate noise generated by a gas turbine engine. Such an acoustic panel typically includes a cellular core connected between a perforated face skin and a solid, non-perforated back skin. The cellular core includes a plurality of resonating chambers. These resonating chambers may be tuned to target a specific frequency of noise to be attenuated by adjusting, among other factors, the chamber length, determined by the core depth.

Recent trends in aircraft engine design such as higher bypass ratios, larger fan diameters, slower rotating fans and/or fewer number of fan blades have resulted in those aircraft engines generating relatively low frequency noise. Relatively strict space constraints for those engines, however, typically limit or prohibit increasing the thickness of an acoustic panel to tune its resonating chambers for relatively low frequency noise. To accommodate these parameters, the assignee of the present patent application is developing an N-core style acoustic panel, see U.S. Patent Publication No. US 2015/0367953 A1. The core structure in an N-core style acoustic panel is difficult to manufacture. The present patent application discloses methods by which such a core might be manufactured. (It's important to note that the methods disclosed herein are not limited to forming the particular core shape shown herein or in the '953 publication.)

SUMMARY OF THE DISCLOSURE

According to an aspect of the present disclosure, a method is provided for forming a structural panel. During this method, a core structure is formed that includes a plurality of corrugated ribbons and a plurality of walls. Each of the corrugated ribbons is laterally between a respective adjacent pair of the walls. Each of the corrugated ribbons includes a plurality of baffles and a plurality of porous septums. Each of the porous septums is longitudinally between a respective adjacent pair of the baffles. The forming of the core structure includes bonding a first of the walls to a first of the corrugated ribbons and subsequently bonding a second of the walls to the first of the corrugated ribbons. The core structure is bonded to a first skin. The core structure is bonded to a second skin. The core structure is vertically between the first skin and the second skin. The first skin is configured with a plurality of perforations.

According to another aspect of the present disclosure, another method is provided for forming a structural panel. During this method, a plurality of core segments are provided. Each of the core segments includes a respective one of a plurality of corrugated ribbons and a respective one of a plurality of walls. Each of the corrugated ribbons includes a plurality of baffles and a plurality of porous septums. Each of the porous septums is longitudinally between a respective adjacent pair of the baffles. Each of the core segments is iteratively bonded to another one of the core segments to form a core structure. Within the core structure, each of the corrugated ribbons is laterally between a respective adjacent pair of the walls. The core structure is bonded to a porous first skin. The core structure is bonded to a second skin. The core structure is vertically between the porous first skin and the second skin.

According to still another aspect of the present disclosure, another method is provided for forming a structural panel. During this method, a plurality of corrugated ribbons and a plurality of planar walls are provided. Each of the corrugated ribbons and each of the planar walls includes thermoplastic material. Each of the corrugated ribbons includes a plurality of baffles and a plurality of porous septums. Each of the porous septums is longitudinally between a respective adjacent pair of the baffles. Each of the corrugated ribbons is bonded to a respective one of the planar walls to provide a plurality of core segments. The core segments are iteratively bonded to one another in a side-by-side fashion to form a core structure. Within the core structure, each of the corrugated ribbons is laterally between a respective adjacent pair of the walls. The core structure is bonded to a first skin. The core structure is bonded to a second skin. The core structure is vertically between the first skin and the second skin. The first skin is configured with a plurality of perforations.

The forming of the core structure may include bonding the second of the walls to a second of the corrugated ribbons and subsequently performing the bonding of the second of the walls to the first of the corrugated ribbons.

The forming of the core structure may include bonding a third of the walls to a third of the corrugated ribbons and subsequently bonding of the third of the walls to the second of the corrugated ribbons.

The forming of the core structure may include bonding a second of the corrugated ribbons to the second of the walls after the second of the walls is bonded to the first of the corrugated ribbons.

The core structure may be configured from or otherwise include thermoplastic material.

The method may include: providing a ribbon of material that comprises thermoplastic; perforating discrete regions of the ribbon of material to provide a perforated ribbon of material; and forming the perforated ribbon of material into a respective one of the corrugated ribbons.

The forming of the perforated ribbon of material may include heating the perforated ribbon of material and subsequently stamping a section of the perforated ribbon of material to provide the respective one of the corrugated ribbons.

The bonding of the second of the walls may include ultrasonic welding the second of the walls to the first of the corrugated ribbons.

The bonding of the second of the walls may include resistant welding the second of the walls to the first of the corrugated ribbons.

The bonding of the second of the walls may include co-consolidating the second of the walls with the first of the corrugated ribbons using an autoclave.

The method may include shaping one or more of the corrugated ribbons to follow a curved contour before the forming of the core structure.

The method may include shaping the core structure to follow a curved contour before bonding the core structure to the first skin and the second skin.

The structural panel may be configured as or otherwise include an acoustic panel configured to attenuate noise.

The providing of the core segments may include bonding a first of the walls to a first of the corrugated ribbons.

The method may include: providing a ribbon of material that comprises thermoplastic; perforating discrete regions of the ribbon of material to provide a perforated ribbon of material; and forming the perforated ribbon of material into the first of the corrugated ribbons.

The providing of the core segments may include foiling a first of the core segments using injection molding.

Each of the core segments may be configured as a discrete unitary body before the performing of the iterative bonding.

The foregoing features and the operation of the invention will become more apparent in light of the following description and the accompanying drawings.

DETAILED DESCRIPTION OF THE INVENTION

The present disclosure includes methods for forming a structural panel using thermoplastic material. An example of such a structural panel 20 is schematically shown in FIG. 1.

Figure 1:
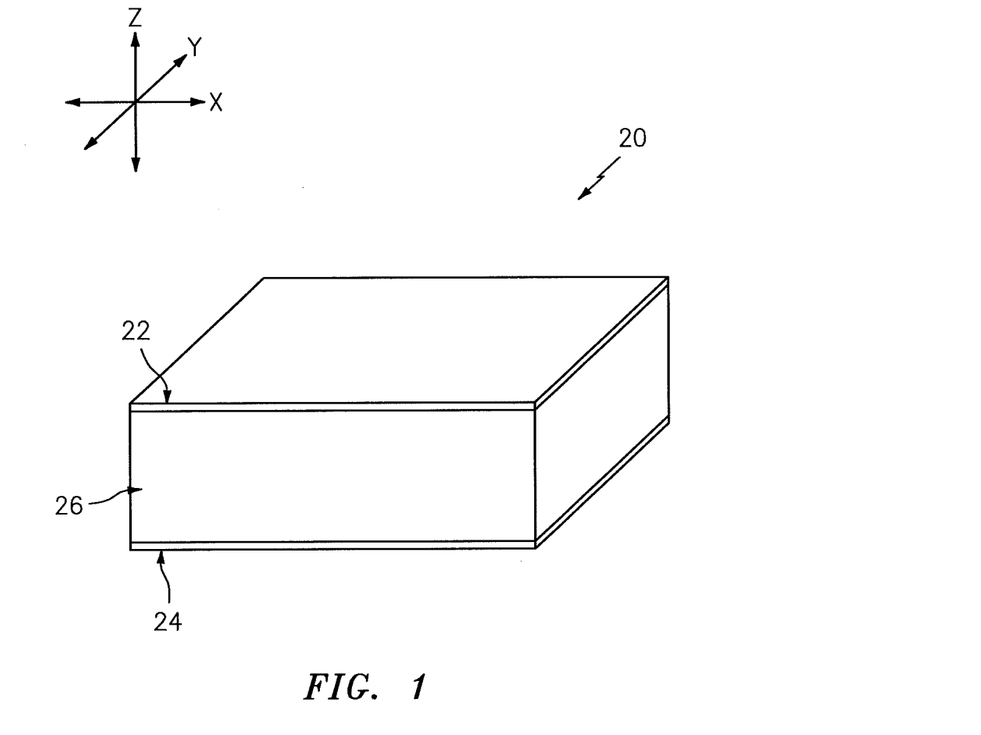
FIG. 1 is a schematic perspective illustration of an acoustic structural panel.

The structural panel 20 of FIG. 1 is configured as an acoustic panel. The structural panel 20, for example, may be configured to attenuate noise generated by an aircraft propulsion system such as, for example, a turbofan propulsion system or a turbojet propulsion system. With such a configuration, the structural panel 20 may be configured to form part of a nacelle of the propulsion system. The structural panel 20, for example, may be configured as or with an inner or outer barrel, a translating sleeve, a blocker door, etc. Alternatively, the structural panel 20 may be configured with another component/structure of the aircraft such as its fuselage or a wing. Furthermore, the structural panel 20 may be configured to also or alternatively attenuate aircraft related noise other than that generated by the propulsion system. The structural panel 20 of the present disclosure, however, may alternatively be configured for non-aircraft applications and/or non-sound suppression applications.

The structural panel 20 of FIG. 1 extends longitudinally along an x-axis. The structural panel 20 extends laterally along a y-axis. The structural panel 20 extends vertically along a z-axis. Note, the term "vertical" is used herein to describe a depthwise panel direction and is not limited to a gravitational up/down direction. Furthermore, for ease of illustration, the x-y plane is shown as a generally flat plane of FIG. 1. However, in other embodiments, the x-y plane and, thus, the structural panel 20 may be curved and/or follow an undulating geometry; e.g., complex 3D curvature. For example, the x-y plane and, thus, the structural panel 20 may be arcuate, cylindrical, conical, or tapered with or without radial undulations. In such embodiments, a solely vertical direction (e.g., z-axis) is defined relative to a position of interest on the x-y plane. For example, on a spherical x-y plane, the vertical direction (e.g., z-axis) is a radial direction.

The structural panel 20 includes a porous first skin 22, a solid non-porous second skin 24 and a cellular core structure 26. Note, the term "porous" is used herein to describe a body with perforations and/or open cell pores that enable flow of gas through the body. The term "non-porous" is used herein to describe a body with a configuration that prevents flow of gas through the body; e.g., a body without perforations or open cell pores.

Briefly, the core structure 26 is disposed and extends vertically between the first skin 22 and the second skin 24. The core structure 26 is also connected to the first skin 22 and the second skin 24. The core structure 26, for example, may be welded, brazed, fused, adhered or otherwise bonded to the first skin 22 and/or the second skin 24. The core structure 26 may also or alternatively be mechanically fastened to the first skin 22 and/or the second skin 24.

Figure 2:
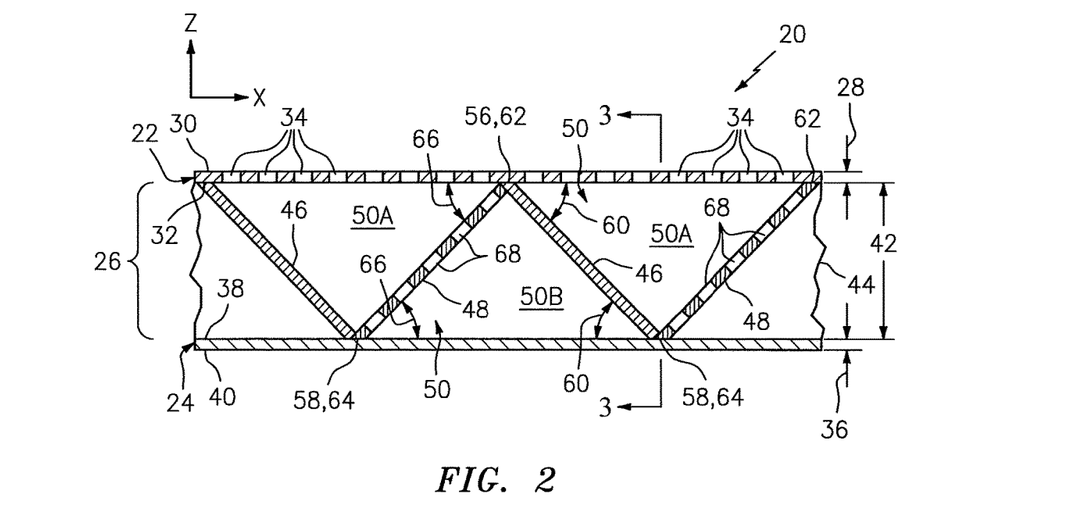
FIG. 2 is a sectional illustration of the structural panel.

The first skin 22 may be configured as a relatively thin sheet or layer of material that extends laterally and longitudinally along the x-y plane. This first skin material may include, but is not limited to, a metal, a polymer (e.g., thermoplastic or thermoset), a fiber reinforced matrix (e.g., fiberglass composite, carbon fiber composite, aramid fiber composite, etc.), or a combination thereof. Referring now to FIG. 2, the first skin 22 has a vertical thickness 28, which extends vertically between opposing side surfaces 30 and 32. The first skin 22 includes a plurality of perforations 34; e.g., apertures such as through-holes. Each of these perforations 34 extends generally vertically through the first skin 22 between its side surfaces 30 and 32.

The second skin 24 may be configured as a relatively thin sheet or layer of (e.g., continuous and uninterrupted) material that extends laterally and longitudinally along the x-y plane (see FIG. 1). This second skin material may include, but is not limited to, a metal, a polymer (e.g., thermoplastic or thermoset), a fiber reinforced composite (e.g., fiberglass composite, carbon fiber composite, aramid fiber composite, etc.), or a combination thereof. The second skin material may be the same as or different than the first skin material. The second skin 24 has a vertical thickness 36, which extends vertically between opposing side surfaces 38 and 40. This vertical thickness 36 may be substantially equal to or different (e.g., greater or less) than the vertical thickness 28 of the first skin 22.

The core structure 26 extends laterally and longitudinally along the x-y plane (see FIG. 1). The core structure 26 has a vertical thickness 42, which extends vertically between opposing core sides, which are abutted against the first skin 22 and the second skin 24. This vertical thickness 42 may be substantially greater than the vertical thickness 28 of first skin 22 and/or the vertical thickness 36 of the second skin 24. The vertical thickness 42, for example, may be at least ten to forty times (10-40×), or more, greater than the vertical thickness 28, 36; however, the structural panel 20 of the present disclosure is not limited to such an exemplary embodiment.

Figure 3:
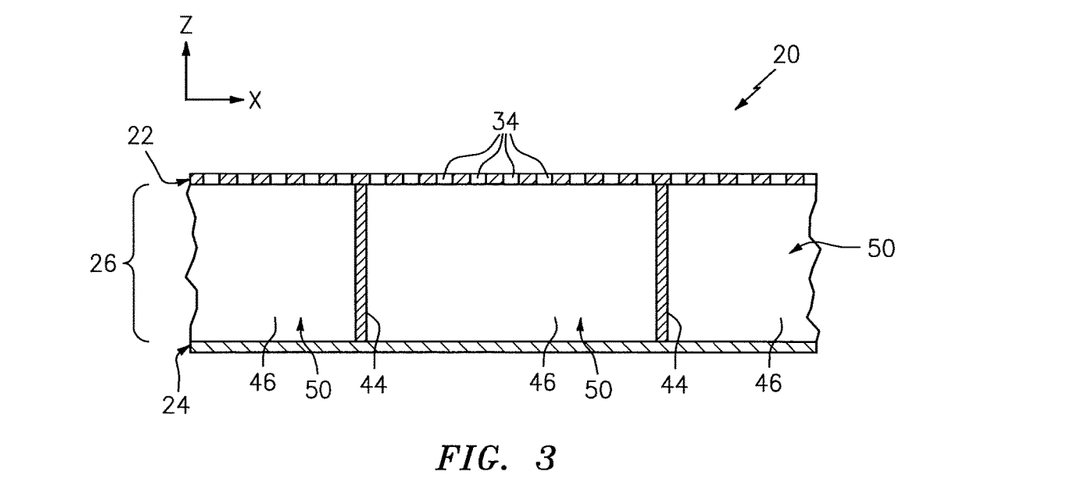
FIG. 3 is a sectional illustration of the structural panel taken along the line 3-3 of FIG. 2.
Figure 4:
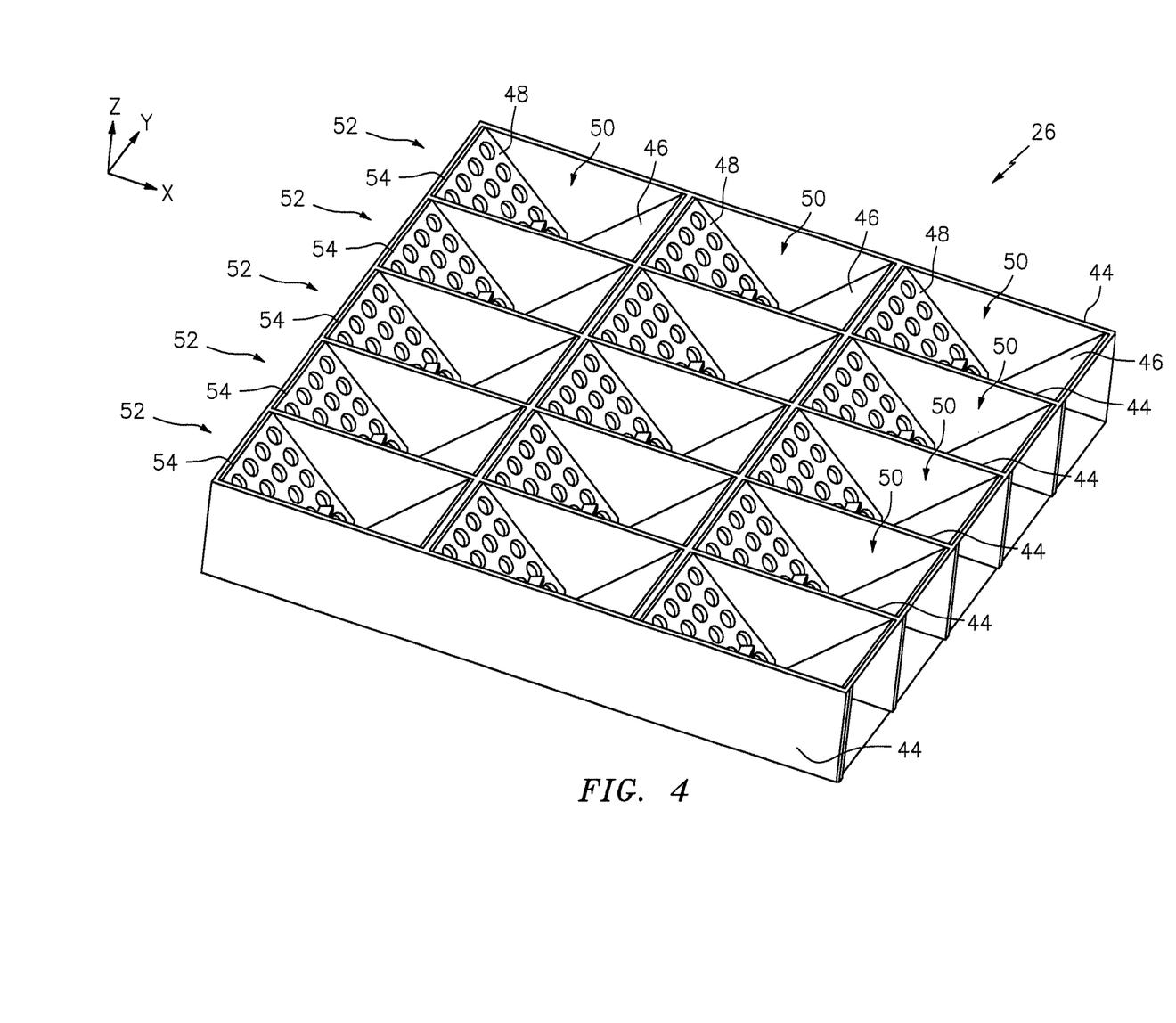
FIG. 4 is a perspective illustration of a cellular core structure.

Referring to FIGS. 2-4, the core structure 26 includes a plurality of non-porous walls 44, a plurality of non-porous baffles 46 and a plurality of porous septums 48. These components 44, 46 and 48 are arranged together to configure the core structure 26 as an open cavity (e.g., open cell) structure. This open cavity structure forms a plurality of cavities 50 (see also FIG. 6) vertically between the first skin 22 and the second skin 24. These cavities 50 may be arranged in a plurality of linear arrays 52 (see FIG. 4), where each array 52 extends longitudinally along the x-axis and parallel to the non-porous walls 44. Each of the cavities 50 may be fluidly coupled with one or more respective perforations 34 in the first skin 22 (see FIGS. 2 and 3).

Each of the walls 44 may be configured as a (e.g., monolithic) generally planar body, which may be continuous vertically between the first skin 22 and the second skin 24 as well as continuous extending longitudinally along one or more of the cavities 50. Thus, a longitudinal length of each wall 44 may be greater than a vertical height of that same wall 44. The walls 44 may be arranged generally parallel with one another. The walls 44 are laterally spaced from one another so as to respectively form the cavities 50 laterally between adjacent walls 44. With this configuration, laterally adjacent cavities 50 (e.g., cavities 50 in laterally adjacent arrays 52) are also fluidly separated from one another by a respective one of the walls 44.

Each of the walls 44 extends vertically between the first skin 22 and the second skin 24 (see FIGS. 2 and 3). Each of the walls 44 may also be connected (e.g., bonded and/or otherwise) to the first skin 22 and/or the second skin 24. Each of the walls 44 is orientated substantially perpendicular to the first skin 22 and the second skin 24. However, in other embodiments, one or more of the walls 44 may be offset from the first skin 22 and/or the second skin 24 by a non-ninety degree angle; e.g., an acute included angle.

Figure 5:
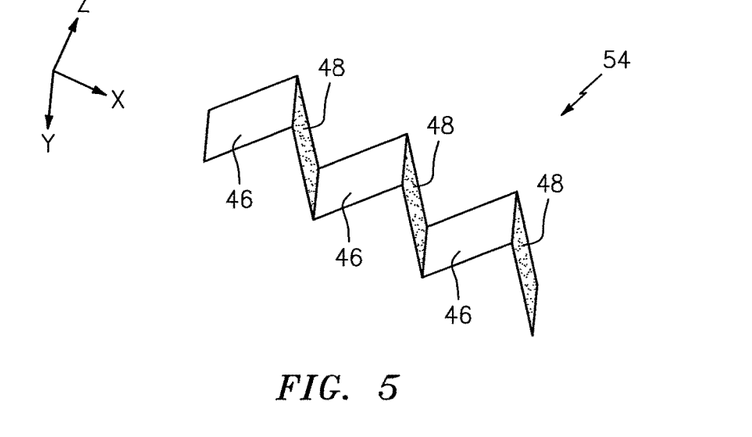
FIG. 5 is a perspective illustration of a corrugated ribbon.

The baffles 46 and the septums 48 are arranged in a plurality of corrugated ribbons 54. An exemplary embodiment of such a corrugated ribbon is shown in FIG. 5. This corrugated ribbon may be configured as a (e.g., monolithic) corrugated body, which may be continuous vertically between the first skin 22 and the second skin 24 as well as continuous extending longitudinally along one or more of the cavities 50. Each corrugated ribbon 54 includes a plurality of the baffles 46 and a plurality of the septums 48. The baffles 46 in each corrugated ribbon are interdisposed with the respective septums 48. More particularly, each of the baffles 46 (unless configured at a longitudinal end of the ribbon 54) is disposed and may extend longitudinally between a respective adjacent pair of the septums 48. Similarly, each of the septums 48 (unless configured at a longitudinal end of the ribbon 54) is disposed and may extend longitudinally between a respective adjacent pair of the baffles 46.

Referring to FIG. 2, one end 56 of each of the baffles 46 is vertically engaged with and/or connected to the first skin 22. An opposing end 58 of each of the baffles 46 is vertically engaged with and/or connected to the second skin 24. Thus, each of the baffles 46 may be angularly offset from the first skin 22 and the second skin 24 by an angle 60; e.g., an acute angle or other (e.g., ninety degree) angle. Similarly, one end 62 of each of the septums 48 is vertically engaged with and/or connected to the first skin 22. An opposing end 64 of each of the septums 48 is vertically engaged with and/or connected to the second skin 24. Thus, each of the septums 48 may be angularly offset from the first skin 22 and the second skin 24 by an angle 66; e.g., an acute angle or other (e.g., ninety degree) angle. In this manner, each corrugated ribbon 54 has a corrugated configuration (see FIG. 5), where one of the baffles 46 and one of the septums 48 may form a single corrugation. Of course, in other embodiments, one or more of the corrugations may each include at least one additional element; e.g., a bridge.

Figure 6:
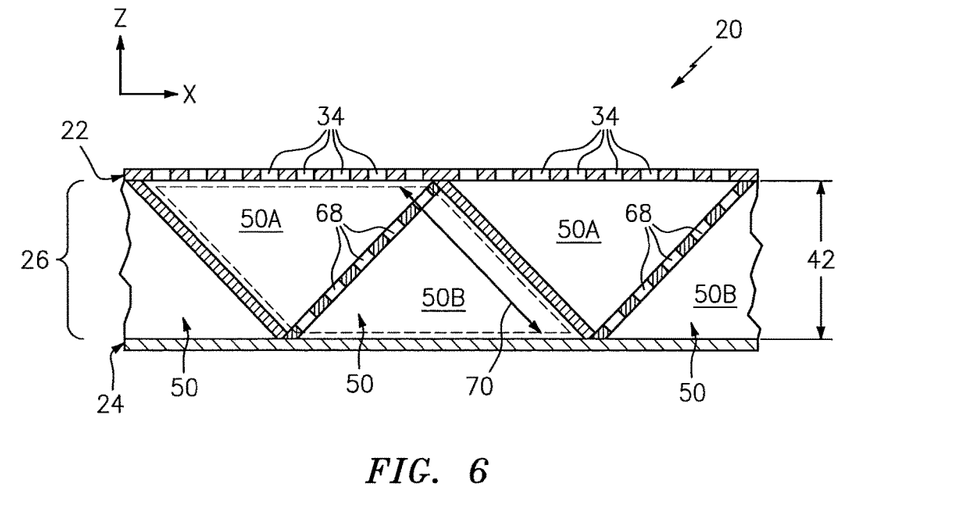
FIG. 6 is another sectional illustration of the structural panel of FIG. 2.

Referring to FIG. 6, each of the cavities 50 extends longitudinally between and is formed by an adjacent pair of the baffles 46. Each septum 48 is disposed within and divides a respective one of the cavities 50 into fluidly coupled sub-cavities 50A and 50B. One or more perforations 68 in the septum 48 fluidly coupled the sub-cavities 50A and 50B together.

With the foregoing core configuration, each of the cavities 50 forms a resonance chamber. A length 70 of the resonance chamber extends diagonally between the first skin 22 and the second skin 24 and through a respective one of the septums 48. The effective acoustic length 70 of the resonance chamber therefore is longer than the vertical thickness 42 of the core structure 26. This enables noise attenuation of relatively low frequency noise without increasing the vertical thickness of the structural panel 20. For example, each resonance chamber may receive noise waves through the perforations in the first skin 22. The resonance chamber may reverse the phase of one or more frequencies of those sound waves using known acoustic resonance and noise cancellation principles and subsequently direct the reverse phase sound waves out of the structural panel 20 through the perforations to destructively interfere with other incoming noise waves.

Figure 7:
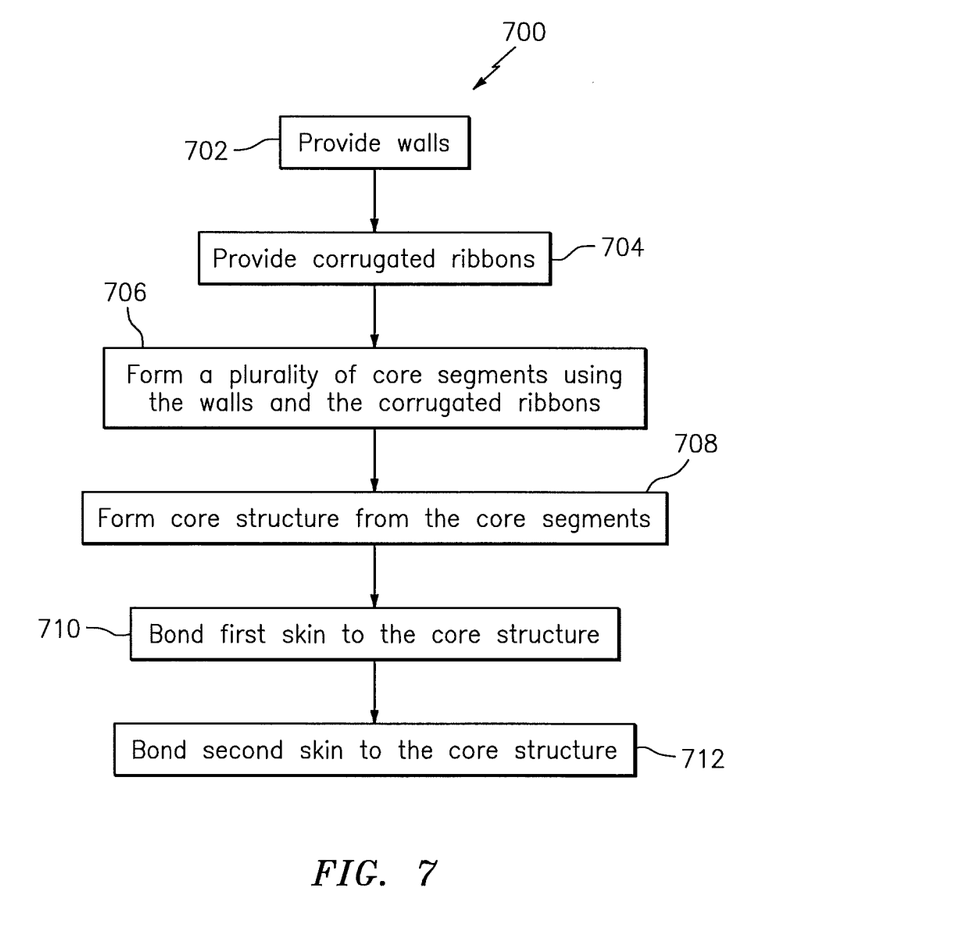
FIG. 7 is a flow diagram of a method for forming a structural panel.

FIG. 7 is a flow diagram of a method 700 for forming a structural panel such as the structural panel 20 described above and illustrated in FIGS. 1-4. In step 702, a plurality of the walls 44 are provided. These walls 44 are configured from a polymer such as thermoplastic material, which may include long strand and/or short strand (e.g., chopped) fiber reinforcement embedded therein. Examples of fiber reinforcement include, but are not limited to, fiberglass, carbon fiber and aramid fiber. In one embodiment, the walls 44 may be formed from stock fiber-reinforced thermoplastic consolidate laminate. In another embodiment, the walls 44 may be injection molded using thermoplastic material and chopped fibers. The present disclosure, however, is not limited to any particular wall formation techniques or wall materials.

In step 704, a plurality of the corrugated ribbons 54 are provided (e.g., see FIG. 5). These corrugated ribbons 54 are configured from a polymer such as thermoplastic material, which may include long strand and/or short strand (e.g., chopped) fiber reinforcement embedded therein. Examples of fiber reinforcement include, but are not limited to, fiberglass, carbon fiber and aramid fiber.

Figure 8:
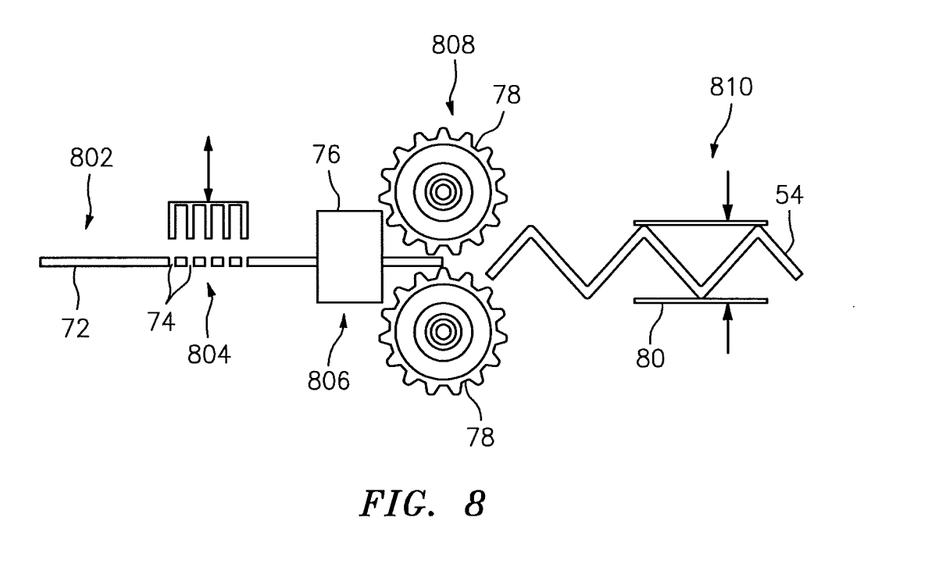
FIG. 8 is a schematic illustration of an exemplary sequence of processes for forming a corrugated ribbon.

FIG. 8 schematically illustrates an exemplary sequence of processes for forming the corrugated ribbons 54. At point 802, a ribbon of material 72 (e.g., fiber-reinforced thermoplastic) is provided. The ribbon of material 72 may be formed from stock fiber-reinforced thermoplastic consolidate laminate, which may be processed (e.g., rolled and/or cut) to provide the ribbon with a predetermined width and thickness. Alternatively, chopped fibers within a thermoplastic resin matrix may be extruded into the ribbon of material 72. Of course, various other processes may also or alternatively be used to provide the ribbon of material 72.

At point 804, a plurality of perforations 74 are formed in discrete regions of the ribbon or material 72. These perforations 74 will become the perforations 68 in the septums 48, and the perforated regions will become the septums 48. The perforations 74 may be formed in the regions of the ribbon of material 72 via punching, or using any other suitable technique. Of course, in alternative embodiments, the perforations 74 may be formed (e.g., punch, drilled, etc.) after corrugated ribbon 54 and/or core segment 82 formation. In still other embodiments, the perforations 74 may be formed during a stamping process for shaping the ribbons; e.g., at point 808.

At point 806, the perforated ribbon of material 72 is heated by a heating element 76.

At point 808, a portion of the heated and perforated ribbon of material 72 is formed into one of the corrugated ribbons 54. For example, the portion of the heated and perforated ribbon of material 72 may be formed (e.g., stamped) via gear forming rollers 78 (or dies 78). Subsequent to (or prior to) the forming, the portion of the heated and perforated ribbon may be cut and separated from the remainder of the ribbon of material 72 being processed. Alternatively, the cut may be made after the stamping process.

At point 810, a flattener 80 may be used to control the vertical height of the corrugated ribbon 54.

Figure 9:
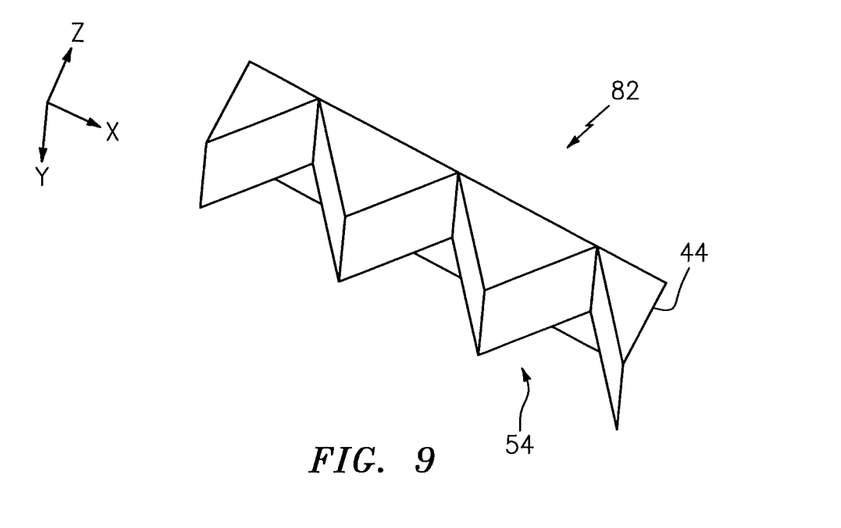
FIG. 9 is a perspective illustration of a core segment.

Referring again to FIG. 7, in step 706, a plurality of core segments 82 are formed. An exemplary embodiment of one of the core segments 82 is shown in FIG. 9. This core segment 82 includes a respective one of the corrugated ribbons 54 and a respective one of the walls 44. To form the core segment 82 of FIG. 9, the corrugated ribbon 54 is disposed adjacent to the wall 44. The wall 44 is then bonded to the corrugated ribbon 54 using, for example, ultrasonic welding, resistance welding, consolidation within an autoclave or other means (e.g., tooling with a device for exerting pressure such as a press), welding via induction heating, or adhering with an adhesive. Of course, other bonding techniques may also or alternatively be used to attach the wall to the corrugated ribbon.

Figure 10:
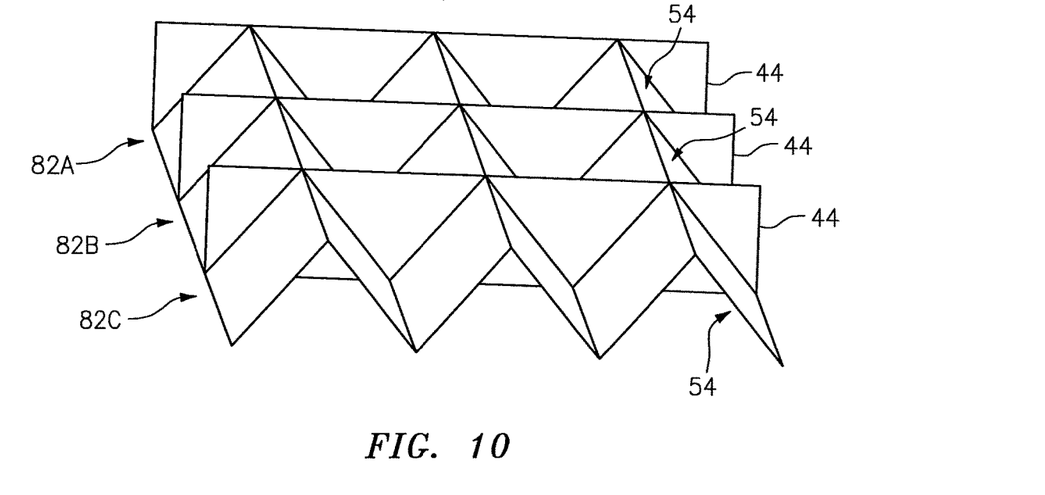
FIG. 10 is a perspective illustration of a plurality of core segments bonded together.

In step 708, the core structure 26 is formed. In particular, the core segments 82 are iteratively bonded to one another in a side-by-side fashion. For example, referring to FIG. 10, the wall 44 of the second core segment 82B is first bonded to the corrugated ribbon 54 of the first core segment 82A. Then, the wall 44 of the third core segment 82C is bonded to the corrugated ribbon 54 of the second core segment 82B. A similar process is repeated for the remaining core segments 82 until all of the core segments 82 are bonded together and form the core structure 26. Adjacent core segments 82 may be bonded together using, for example, ultrasonic welding, resistance welding, consolidation within an autoclave or other means (e.g., tooling with a device for exerting pressure such as a press), welding via induction heating, or adhering with an adhesive. In the case of ultrasonic welding, an angled horn may be used to provide welding tool access. Of course, other bonding techniques may also or alternatively be used to attach adjacent core segments 82 together.

In step 710, the first skin 22 is bonded to the core structure 26. In step 712, the second skin 24 is bonded to the core structure 26. The steps 710 and 712 may be performed sequentially (e.g., either 710 and then 712, or 712 and then 710). Alternatively, the steps 710 and 712 may be performed substantially simultaneously.

In some embodiments, the first skin 22 may be perforated before being bonded to the core structure 26. In other embodiments, the first skin 22 may be perforated after being bonded to the core structure 26.

As discussed above, the structural panel 20 may have a complex curvature; e.g., curved along both the x-axis and y-axis. To facilitate the provision of this curvature, one or more of the corrugated ribbons 54 may be shaped (e.g., via thermoforming) to follow a curved contour before bonding those ribbons to the respective walls 44. In addition or alternatively, one or more of the core segments 82 may be shaped to follow a curved contour before forming the core structure 26; e.g., bonding the core segments 82 together. Still in addition or alternatively, the core structure 26 may be shaped to follow a curved contour before (or after) being bonded to the first skin 22 and/or the second skin 24.

In other embodiments, the corrugated ribbons 54 may be formed using an injection molding process, profile extruded, blow molding process, or otherwise. In still other embodiments, each core segment may be formed as a monolithic body using an injection molding process, blow molding process, or otherwise. Thus, one of the corrugated ribbons 54 may be formed integrally with one of the walls 44.

In other embodiments, rather than forming the core segments 82, the corrugated ribbons 54 and the walls 44 may be sequentially and iteratively bonded to one another. For example, a first of the walls 44 may be bonded to a first side of a first of the corrugated ribbons 54. Then, a second of the walls 44 may be bonded to a second (opposing) side of the first of the corrugated ribbons 54. Then, a second of the corrugated ribbons 54 may be bonded to the second of the walls 44, etc.

The foregoing formation techniques may be easily adapted for automation.

The foregoing formation techniques may be used to form panels with geometries and configurations other than that described above. For example, while the angles 60 and 66 are shown in FIG. 2 as being approximately 45 degrees, in other embodiments those angles may be more or less than 45 degrees; e.g., 60 degrees. In another example, while the angles 60 and 66 are shown as being approximately equal to one another in FIG. 2, in other embodiments the angles 60 and 66 may have different values. For example, the angle 60 may be an acute angle whereas the angle 66 may be approximately 90 degrees.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. A method for forming a structural panel, comprising:
   forming a core structure that includes a plurality of corrugated ribbons and a plurality of walls, each of the corrugated ribbons laterally between a respective adjacent pair of the walls, each of the corrugated ribbons including a plurality of baffles and a plurality of porous septums, and each of the porous septums longitudinally between a respective adjacent pair of the baffles;
   the forming of the core structure comprising bonding a first of the walls to a first of the corrugated ribbons and subsequently bonding a second of the walls to the first of the corrugated ribbons;
   bonding the core structure to a first skin; and
   bonding the core structure to a second skin;
   wherein the core structure is vertically between the first skin and the second skin, and the first skin is configured with a plurality of perforations.

2. The method of claim 1, wherein the forming of the core structure further comprises bonding the second of the walls to a second of the corrugated ribbons and subsequently performing the bonding of the second of the walls to the first of the corrugated ribbons.

3. The method of claim 2, wherein the font ling of the core structure further comprises bonding a third of the walls to a third of the corrugated ribbons and subsequently bonding of the third of the walls to the second of the corrugated ribbons.

4. The method of claim 1, wherein the forming of the core structure further comprises bonding a second of the corrugated ribbons to the second of the walls after the second of the walls is bonded to the first of the corrugated ribbons.

5. The method of claim 1, wherein the core structure comprises thermoplastic material.

6. The method of claim 1, further comprising:
providing a ribbon of material that comprises thermoplastic;
perforating discrete regions of the ribbon of material to provide a perforated ribbon of material; and
forming the perforated ribbon of material into a respective one of the corrugated ribbons.

7. The method of claim 6, wherein the forming of the perforated ribbon of material comprises heating the perforated ribbon of material and subsequently stamping a section of the perforated ribbon of material to provide the respective one of the corrugated ribbons.

8. The method of claim 1, wherein the bonding of the second of the walls comprises ultrasonic welding the second of the walls to the first of the corrugated ribbons.

9. The method of claim 1, wherein the bonding of the second of the walls comprises resistant welding the second of the walls to the first of the corrugated ribbons.

10. The method of claim 1, wherein the bonding of the second of the walls comprises co-consolidating the second of the walls with the first of the corrugated ribbons using an autoclave.

11. The method of claim 1, further comprising shaping one or more of the corrugated ribbons to follow a curved contour before the forming of the core structure.

12. The method of claim 1, further comprising shaping the core structure to follow a curved contour before bonding the core structure to the first skin and the second skin.

13. The method of claim 1, wherein the structural panel comprises an acoustic panel configured to attenuate noise.

14. A method for forming a structural panel, comprising:
providing a plurality of core segments, each of the core segments including a respective one of a plurality of corrugated ribbons and a respective one of a plurality of walls, each of the corrugated ribbons including a plurality of baffles and a plurality of porous septums, and each of the porous septums longitudinally between a respective adjacent pair of the baffles;
iteratively bonding each of the core segments to another one of the core segments to form a core structure, wherein, within the core structure, each of the corrugated ribbons is laterally between a respective adjacent pair of the walls;
bonding the core structure to a porous first skin; and
bonding the core structure to a second skin;
wherein the core structure is vertically between the porous first skin and the second skin.

15. The method of claim 14, wherein the providing of the core segments comprises bonding a first of the walls to a first of the corrugated ribbons.

16. The method of claim 15, further comprising:
providing a ribbon of material that comprises thermoplastic;
perforating discrete regions of the ribbon of material to provide a perforated ribbon of material; and
forming the perforated ribbon of material into the first of the corrugated ribbons.

17. The method of claim 14, wherein the providing of the core segments comprises forming a first of the core segments using injection molding.

18. The method of claim 14, wherein each of the core segments is configured as a discrete unitary body before the performing of the iterative bonding.

19. A method for forming a structural panel, comprising:
providing a plurality of corrugated ribbons and a plurality of planar walls, wherein each of the corrugated ribbons and each of the planar walls comprises thermoplastic material, each of the corrugated ribbons includes a plurality of baffles and a plurality of porous septums, and each of the porous septums is longitudinally between a respective adjacent pair of the baffles;
bonding each of the corrugated ribbons to a respective one of the planar walls to provide a plurality of core segments;
iteratively bonding the core segments to one another in a side-by-side fashion to form a core structure, wherein, within the core structure, each of the corrugated ribbons is laterally between a respective adjacent pair of the walls;
bonding the core structure to a first skin; and
bonding the core structure to a second skin;
wherein the core structure is vertically between the first skin and the second skin, and the first skin is configured with a plurality of perforations.

* * * * *